United States Patent
Yang et al.

(10) Patent No.: US 8,243,777 B2
(45) Date of Patent: Aug. 14, 2012

(54) METHOD AND APPARATUS FOR ESTIMATING SYMBOL TIMING OFFSET IN WIRELESS COMMUNICATION SYSTEM

(75) Inventors: Joo Yeol Yang, Suwon-si (KR); Hee Jin Roh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 636 days.

(21) Appl. No.: 12/493,904

(22) Filed: Jun. 29, 2009

(65) Prior Publication Data
US 2009/0323843 A1    Dec. 31, 2009

(30) Foreign Application Priority Data
Jun. 27, 2008    (KR) .................. 10-2008-0061563

(51) Int. Cl.
*H04B 1/00* (2006.01)
(52) U.S. Cl. ........ 375/149; 375/145; 375/354; 375/364; 370/500; 370/510; 370/512
(58) Field of Classification Search ................. 375/141, 375/145, 147, 149, 260, 267, 40, 347, 354, 375/363–366, 369; 370/203, 206, 500, 503, 370/509, 510, 512
See application file for complete search history.

(56) References Cited

U.S. PATENT DOCUMENTS

| | | | |
|---|---|---|---|
| 6,650,617 B1 * | 11/2003 | Belotserkovsky et al. | ... 370/210 |
| 7,630,450 B2 * | 12/2009 | Duncan | .......... 375/260 |
| 2010/0202547 A1 * | 8/2010 | Taga et al. | ..... 375/260 |

* cited by examiner

*Primary Examiner* — Dac Ha
(74) *Attorney, Agent, or Firm* — The Farrell Law Firm, P.C.

(57) ABSTRACT

A method and an apparatus for estimating a symbol timing offset in an Orthogonal Frequency Division Multiplexing (OFDM) based communication system are provided. A Carrier to Interference Ratio (CIR) of an Reference Signal (RS) is acquired using received pilot signals. The RS CIR includes power information on channel components of the RS. A CIR of a Secondary Synchronization Channel (S-SCH) is acquired using the received pilot signals. The S-SCH CIR includes power information on channel components of the S-SCH. Unnecessary channel components are suppressed from the RS CIR using the S-SCH CIR. Real channel components of the RS remain. An observation window is set having a predetermined duration for windowing the real channel components of the RS. A first arriving channel component is searched for within the observation window. A start point of data is estimated using the first arriving channel component.

25 Claims, 16 Drawing Sheets

Normal CP

Extended CP

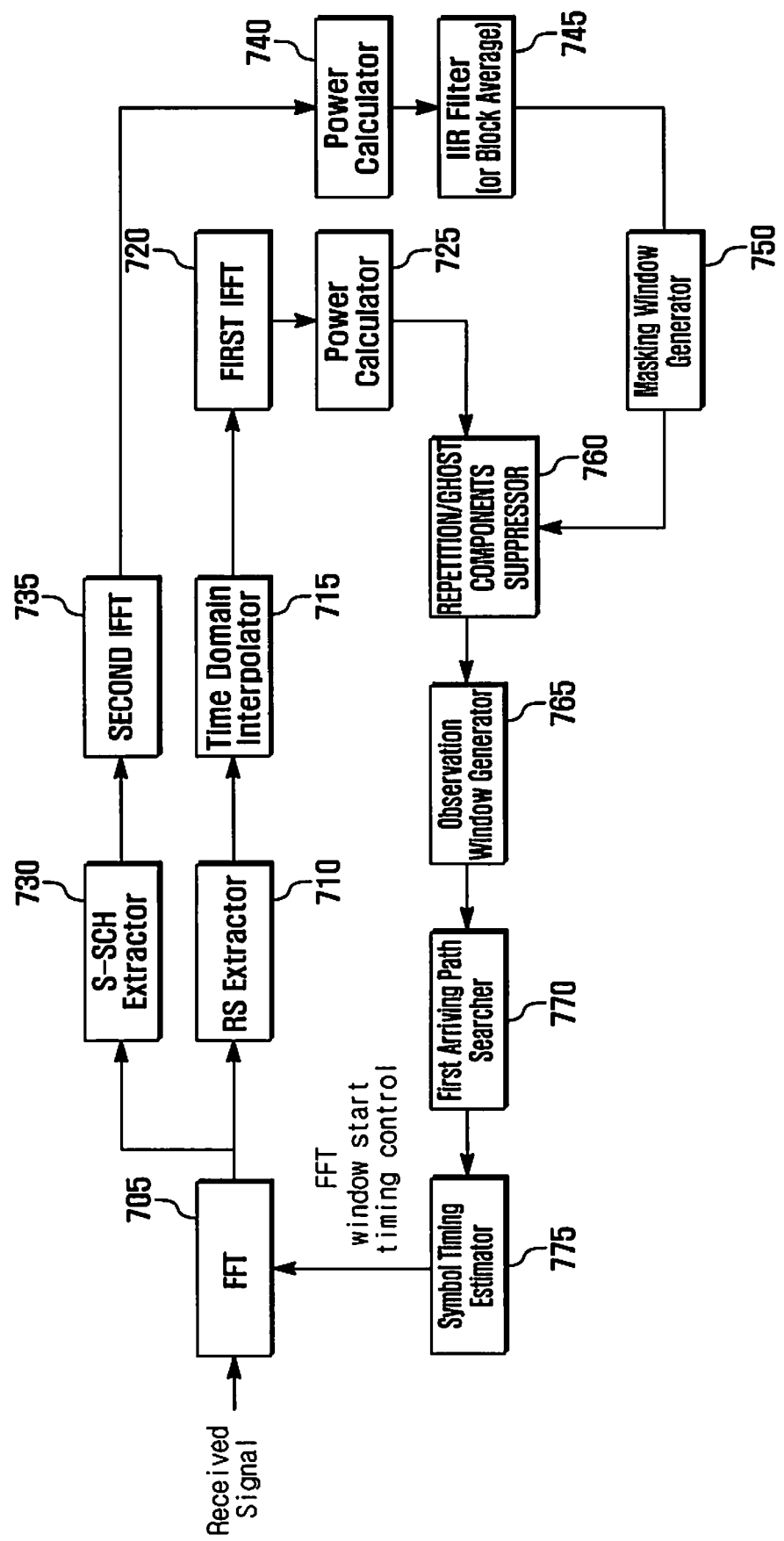

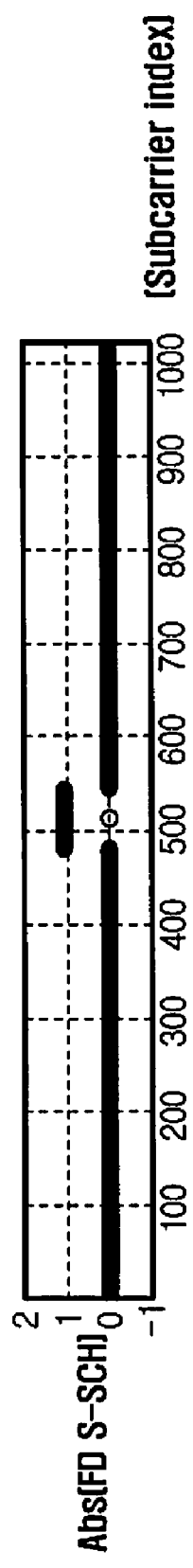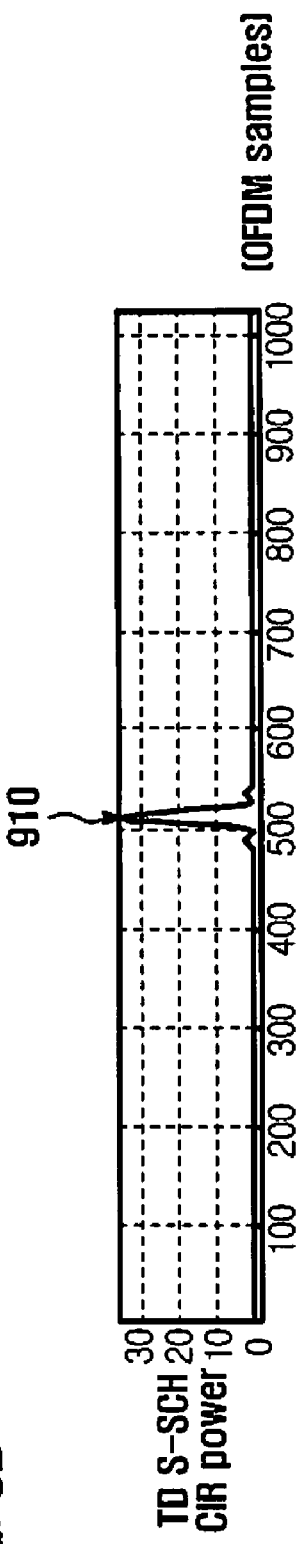
FIG. 9A
FIG. 9B

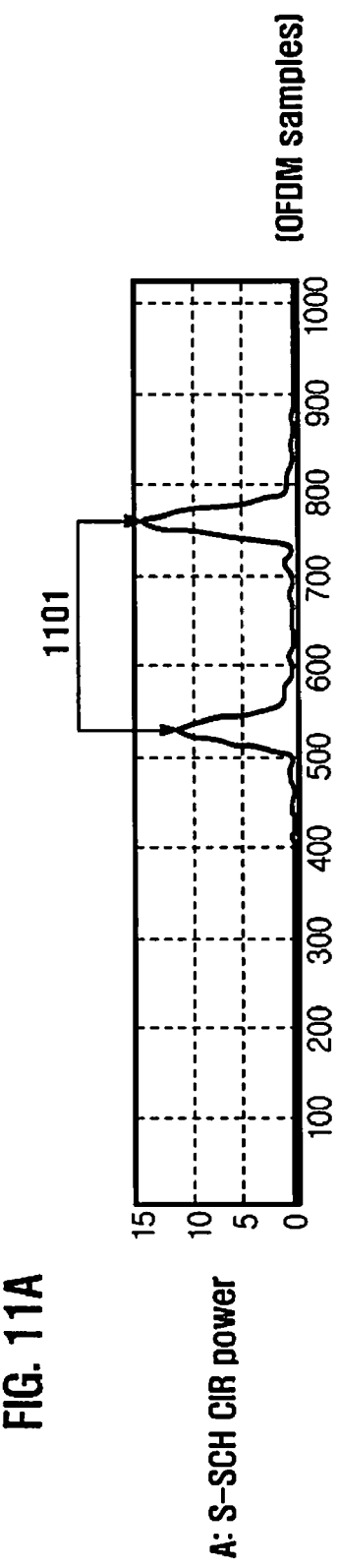
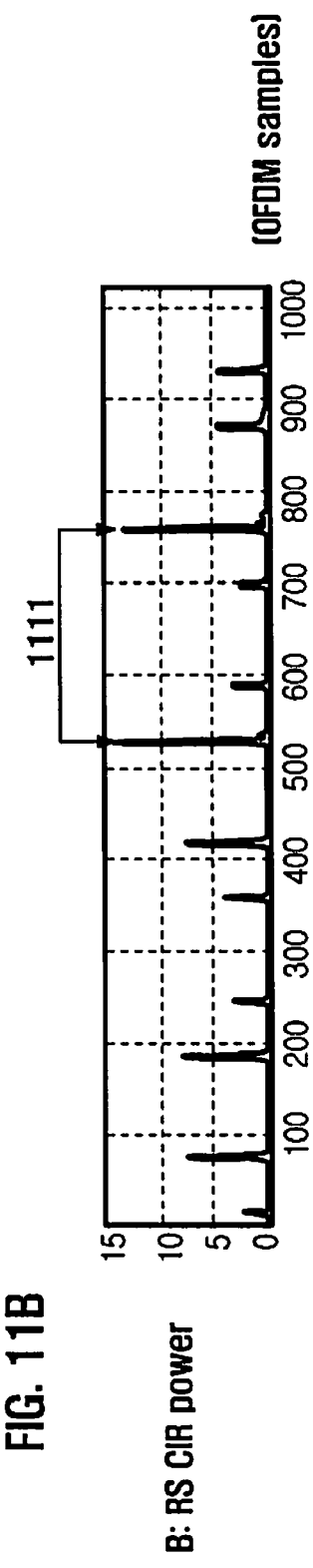
FIG. 11A  A: S-SCH CIR power
FIG. 11B  B: RS CIR power
FIG. 11C  AxB A: S-SCH CIR power B: S-SCH CIR power (Threshold test)

C: Moving sum of B

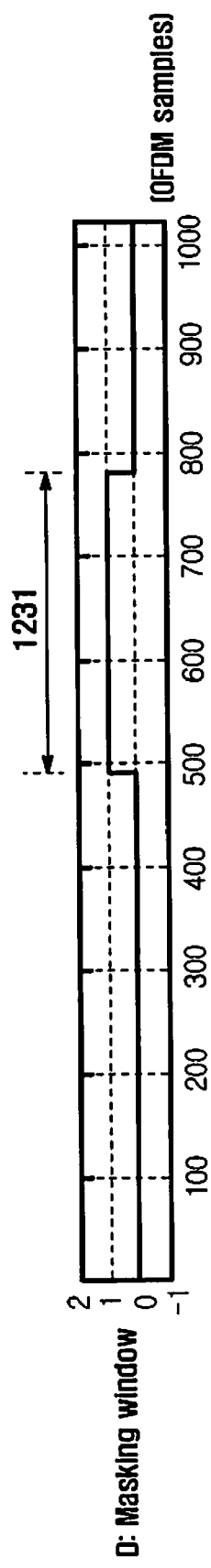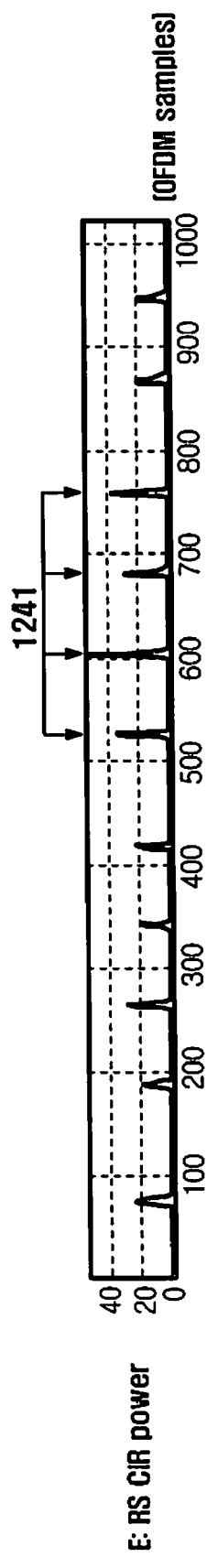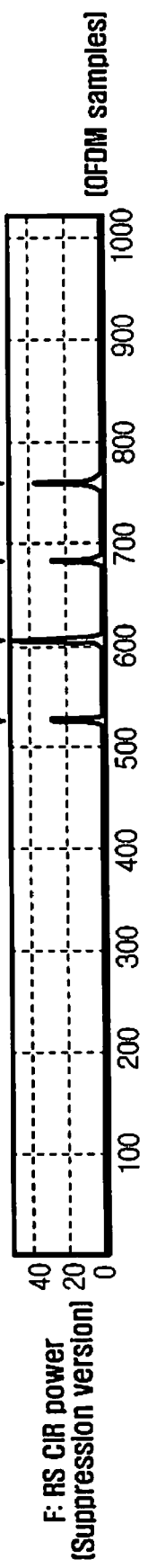
FIG. 12D
FIG. 12E
FIG. 12F

METHOD AND APPARATUS FOR ESTIMATING SYMBOL TIMING OFFSET IN WIRELESS COMMUNICATION SYSTEM

PRIORITY

This application claims priority under 35 U.S.C. §119(a) to an application entitled "METHOD AND APPARATUS FOR ESTIMATING SYMBOL TIMING OFFSET IN WIRELESS COMMUNICATION SYSTEM" filed in the Korean Intellectual Property Office on Jun. 27, 2008 and assigned Serial No. 10-2008-0061563, the content of which is incorporated herein by reference.

BACKGROUND OF THE INVENTION

1. Field of the Invention

The present invention relates generally to symbol timing offset estimation and, more particularly, to a method and apparatus for estimating a symbol timing offset in an Orthogonal Frequency Division Multiplexing (OFDM) based communication system.

2. Description of the Related Art

Much research has been conducted in order to provide users with high speed data services satisfying various Quality of Service (QoS) requirements. Particularly, research has been focused on the improvement of the high speed data communication services while guaranteeing mobility and QoS in a Broadband Wireless Access (BWA) communication system, such as a Wireless Local Area Network (WLAN) or a Wireless Metropolitan Area Network (WMAN). In order to achieve a high speed data rate over wired and wireless communication channels, OFDM is one of the most promising technologies. As one of the MultiCarrier Modulation (MCM) schemes, OFDM converts a serial input symbol stream into parallel streams and modulates the parallel streams orthogonally into multiple subcarriers.

In the wireless channel environment, unlike the wired channel environment, the transmission signal is likely to be erroneous due to various factors such as multipath interference, shadowing, attenuation, time-varying noise, Intersymbol Interference (ISI) caused by delay spread, and frequency selective fading, resulting in data loss at the receiver. Typically, in a wireless communication system, multipath fading channels are generated between the transmitter and the receiver in the wireless communication system due to various obstacles therebetween. In such a multipath channel environment, the transmission signal is received via multiple paths that are created due to the reflection of the signal from obstacles. The start point of a symbol should be determined in consideration of the multipath propagation so as to minimize the ISI caused by the multipath channels. The process for finding the start point is referred to as a symbol timing offset estimation or symbol synchronization process.

Typically, the symbol timing offset is estimated using a Reference Signal (RS) carried by pilot tones, while receiving downlink signals to find the start point of symbol. However, the RS-based symbol synchronization is likely to cause ambiguity of symbol timing offsets due to the repetition components, as shown in FIG. 1, especially in the multipath fading channel environment in which the maximum delay spread is relatively large. The maximum delay spread is the time taken until the last reflection signal is received after the receiver starts receiving the signal.

FIG. 1 is a graph illustrating channel components of a conventional OFDM system in a multipath fading channel environment having a large delay spread. As shown in FIG. 1, in the multipath-fading channel environment characterized by the large delay spread, repetition components 110 appear according to the structural characteristic of the RF pilot signals, as well as the real channel components. When an observation window 101 is fixedly set with its center positioned where Inverse Fast Fourier Transform (IFFT) output occurs, the repetition components 110 appear prior to channel components 120 of the real signal in the range of the observation window 101 such that the repetition components 110 are likely to be recognized as the first arrival path. Accordingly, the signal received through the repetition components is misunderstood as the signal of the real channel path, thereby causing ambiguity of timing offsets in the symbol timing offset estimation process.

In the multipath channel environment, the multipath fading channel environment is aggravated due to a high Doppler frequency shift as the movement speed of the mobile terminal increases. In such a case, ghost components of the signal, in addition to the repetition components, may appear due to the interpolation error on the time axis of the RF as shown in FIG. 2.

FIG. 2 is a graph illustrating channel components of a conventional OFDM system in a multipath fading channel environment having high Doppler shift frequencies.

As shown in FIG. 2, in the multipath fading channel environment characterized by high Doppler frequencies, the repetition components caused by the structural characteristic of the RF pilot signals and ghost components 210 appear as well as real channel components 220. Particularly, when an observation window 201 is fixedly set with its center positioned where the IFFT output occurs, the ghost components 210 appear prior to the channel components 220 of the real signal in the range of the observation window 201. However, the conventional OFDM-based communication system does not provide a specific process for processing the ghost components. When the mobile terminal moves fast, the symbol timing offset estimation performance of the mobile terminal is significantly deteriorated due to the increase of the ghost components. Accordingly, there have been efforts to reduce the deterioration of the symbol timing offset estimation performance that is caused by the repetition components and/or the ghost components.

SUMMARY OF THE INVENTION

The present invention has been made to address at least the above problems and/or disadvantages and to provide at least the advantages described below. Accordingly, an aspect of the present invention provides a symbol timing offset estimation method and apparatus for a wireless communication system that is capable of improving the symbol timing offset estimation performance.

Another aspect of the present invention provides a symbol timing offset estimation method and apparatus for an OFDM communication system that is capable of improving the symbol timing offset estimation performance by suppressing unnecessary channel components.

According to one aspect of the present invention, a symbol timing offset estimation method for an Orthogonal Frequency Division Multiplexing (OFDM) system is provided. A Carrier to Interference Ratio (CIR) of a Reference Signal (RS) is acquired using received pilot signals. The RS CIR includes power information on channel components of the RS. A CIR of a Secondary Synchronization Channel (S-SCH) is acquired using the received pilot signals. The S-SCH CIR includes power information on channel components of the S-SCH. Unnecessary channel components are suppressed from the RS CIR using the S-SCH CIR. Real channel components of the RS remain. An observation window is set having a predetermined duration for windowing the real channel components of the RS. A first arriving channel component is searched for within the observation window. A start point of data is estimated using the first arriving channel component.

Setting an observation window may include detecting a peak having a highest power value within a fixed observation window having a predetermined duration centered around an Inverse Fast Fourier Transform (IFFT) output time point. A variable observation window may be set having a predetermined duration centered around a position of the peak. Suppressing unnecessary channel components may include performing a threshold test on the acquired S-SCH CIR. Power values may be summed in units of a predetermined period while moving within a range of the S-SCH CIR. A predetermined value may be applied to the summed power values within a range centered around a highest summed power value. Result values obtained by applying the predetermined to the summed power values may be multiplied with the RS CIR.

According to another aspect of the present invention, a symbol timing offset estimation apparatus for an Orthogonal Frequency Division Multiplexing (OFDM) system is provided. The apparatus includes a Carrier to Interference ratio (CIR) calculator which acquires a CIR of a Reference Signal (RS) using received pilot signals. The RS CIR includes power information on channel components of the RS. The calculator acquires a CIR of a Secondary Channel (S-SCH) using the received pilot signals. The S-SCH CIR includes power information on channel components of the S-SCH. The apparatus also includes a noise suppressor which suppresses unnecessary channel components from the RS CIR using the S-SCH CIR. Real channel components of the RS remain. The apparatus further includes an observation window generator, which generates an observation window having a predetermined duration for windowing the real channel components of the RS. The apparatus additionally includes a symbol timing offset estimator which estimates, when a first arriving channel component is searched within the observation window, a start position of data using the first arriving channel component.

The observation window generator may set a fixed observation window having a predetermined duration centered around an Inverse Fast Fourier Transform (IFFT) output time point in the range of the RS CIR, detect a peak having a highest power value within the fixed observation window, and set a variable observation window having a predetermined duration centered around a position of the peak.

BRIEF DESCRIPTION OF THE DRAWINGS

The above and other aspects, features and advantages of the present invention will be more apparent from the following detailed description when taken in conjunction with the accompanying drawings, in which:

FIG. 7 is a block diagram illustrating a configuration of a symbol timing offset estimation apparatus of a modem for an LTE system, according to an embodiment of the present invention;

FIG. 9A is a graph illustrating characteristics of an S-SCH pilot signal in frequency domain for use in symbol timing offset estimation, according to an embodiment of the present invention;

FIG. 9B is a graph illustrating a CIR estimation result obtained from the S-SCH pilot signal characterized as in FIG. 9A;

FIG. 11A is a graph illustrating an S-SCH CIR estimation result for use in the symbol timing offset estimation method, according to an embodiment of the present invention;

FIG. 11B is a graph illustrating an RS CIR estimation result for use in the symbol timing offset estimation method, according to an embodiment of the present invention;

FIG. 11C is a graph illustrating an RS CIR estimation result of which repetition components and/or ghost components are suppressed using the S-SCH CIR estimation result of FIG. 11A;

FIG. 12D is a graph illustrating a masking window produced based on the intermediate signal form of FIG. 12C;

FIG. 12E is a graph illustrating an RS CIR estimation result, according to an embodiment of the present invention;

FIG. 12F is a graph illustrating a signal form obtained by suppressing unnecessary frequency components from the RS CIR estimation result of FIG. 12E;

DETAILED DESCRIPTION OF PREFERRED EMBODIMENTS

Figure 1:
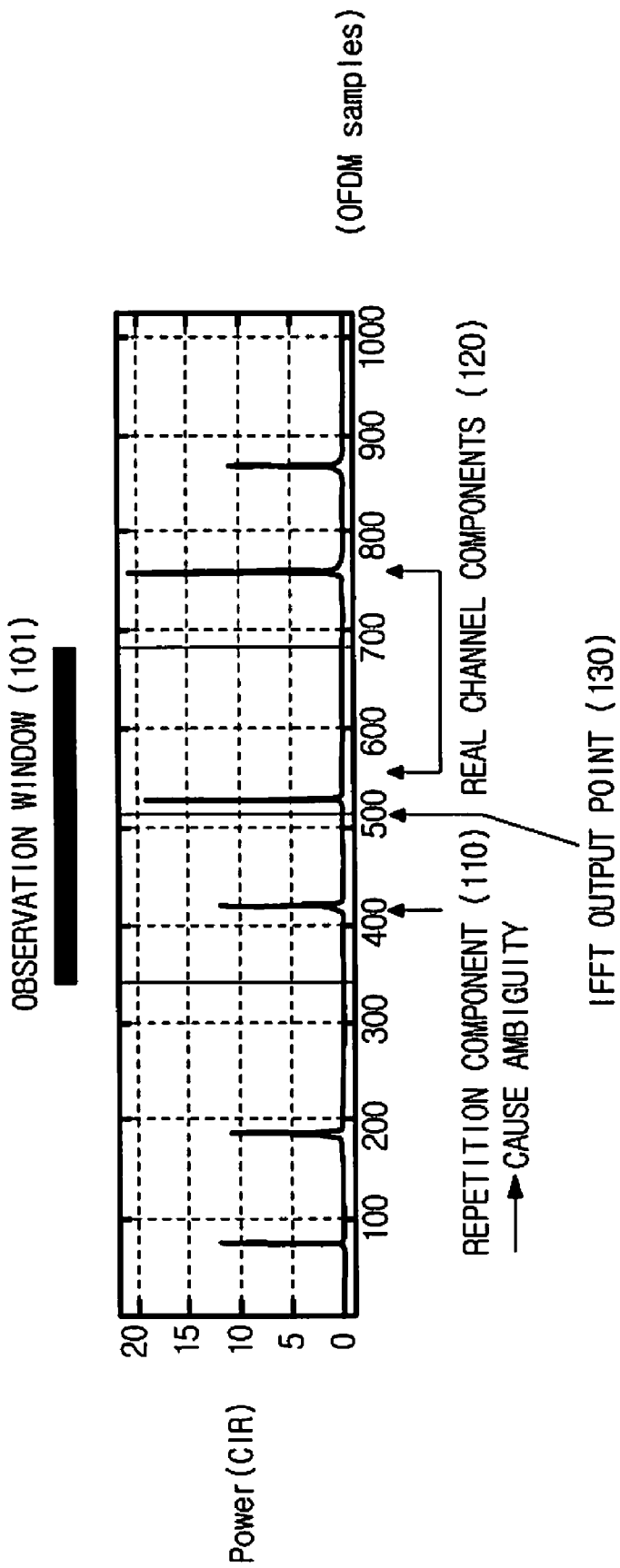
FIG. 1 is a graph illustrating channel components appearing in a conventional OFDM system in a multipath fading channel environment having a large delay spread.
Figure 2:
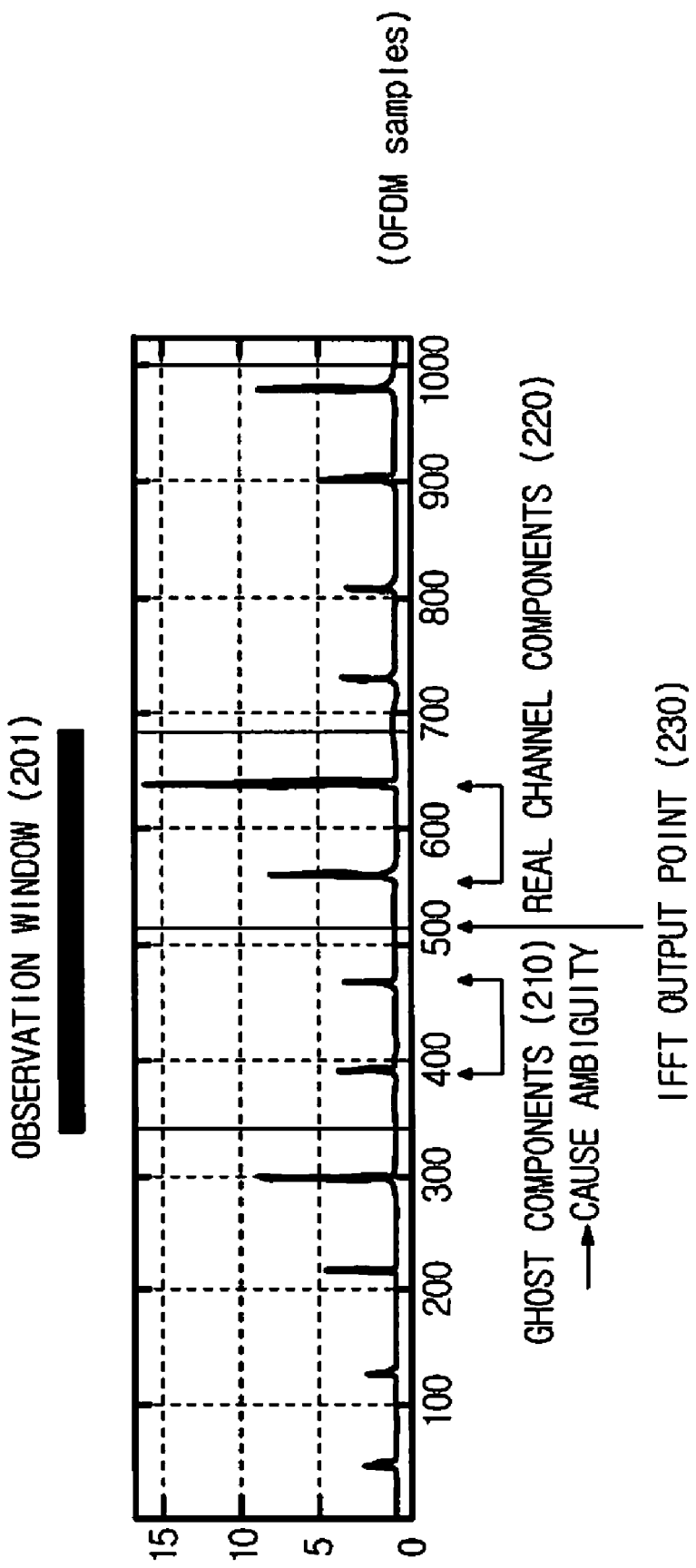
FIG. 2 is a graph illustrating channel components appearing in a conventional OFDM system in a multipath fading channel environment having high Doppler shift frequencies.

Preferred embodiments of the present invention are described in detail with reference to the accompanying drawings. The same or similar reference numerals may be used throughout the drawings to refer to the same or similar components. Detailed descriptions of constructions or processes known in the art may be omitted to avoid obscuring the subject matter of the present invention.

In the symbol timing offset estimation method, it is key to determine the start point of the data, i.e. the start point of a received symbol, for minimization of the InterSymbol Interference (ISI). Once the start point of the received symbol is determined, the receiver performs Fast Fourier Transform (FFT) and Inverse Fast Fourier Transform (IFFT) at the start point of the symbol, extracts the first arrival channel component among the channel components appearing within an observation window, and estimates a symbol timing offset equal to the length between the start point of the symbol and the first arrival channel component. Optimization of the FFT start position for minimizing the ISI in the multipath channel environment between the transmitter and the receiver is described with reference to FIG. 3.

Figure 3:
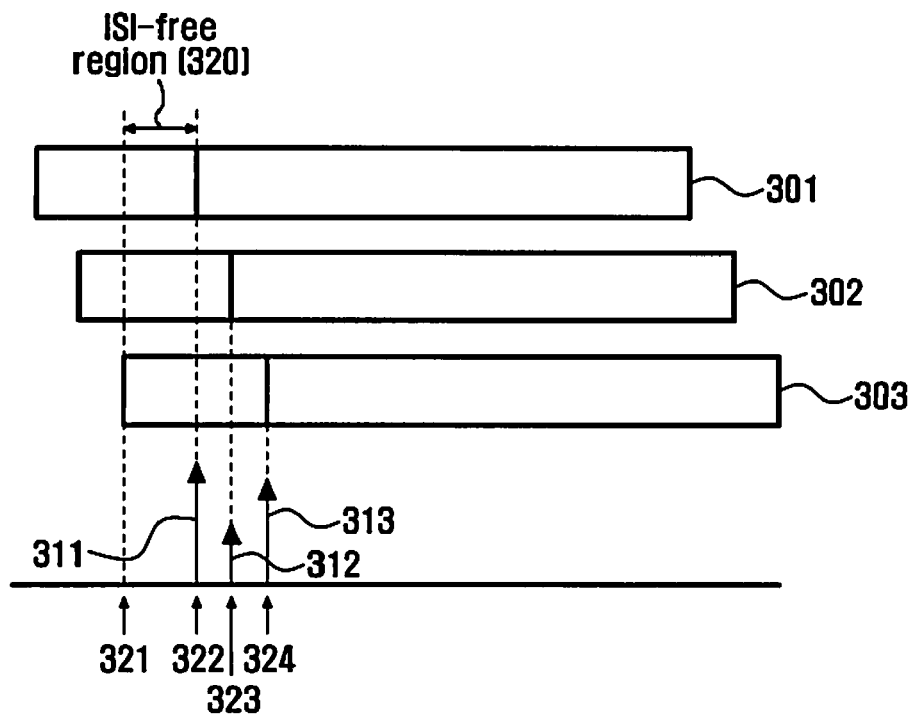
FIG. 3 is a diagram illustrating a frame received at a receiver through multiple channels in a multipath channel environment, according to an embodiment of the present invention.

FIG. 3 is a diagram illustrating a frame received at a receiver through multiple channels in a multipath channel environment, according to an embodiment of the present invention. In FIG. 3, three replicas 301, 302, and 303 of the frame transmitted by a transmitter experience different channel conditions and are received at a receiver with different channel delays.

Referring to FIG. 3, the first replica 301 of the frame (hereinafter referred to as a first frame 301) is received through a first arrival path (hereinafter referred to as a first channel); the second replica 302 of the frame (hereinafter referred to as a second frame 302) is received through a second arriving path (hereinafter referred to as a second channel); and the third replica 303 of the frame (hereinafter referred to as a third frame 303) is received through a third arriving path (hereinafter referred to as a third channel). The start point of the real symbol of the first frame 301 is time point 322 at which the a CP, which is a guard interval inserted for reducing the ISI effect, ends and a first channel component 311 is positioned. The start point of the real symbol of the second frame 302 is time point 323 at which the CP ends and a second channel component 312 is positioned. The start point of the real symbol of the third frame 303 is time point 324 at which the CP ends and a third channel component 313 is positioned. The FFT start point for minimizing the ISI in the multipath fading channel environment, as shown in FIG. 3, falls in the range between a start point 321 of the third frame 303 and the start point 322 of the real symbol of the first frame 301, which is referred to as an ISI-free region 320. Here, the ISI can be minimized at the time when the first channel is received, and the optimal FTT start time is the time point 322 at which the first channel component 311 is positioned. In order to detect the first channel component 311, a pilot signal is used. The detection of the first channel component using the pilot signal is described in greater detail below.

In the Long Term Evolution (LTE) system, the OFDM and the Orthogonal Frequency Division Multiple Access (OFDMA) are adopted for achieving a high-speed data transmission rate. In the OFDM system, three types of pilot signals can be transmitted. These pilot signals include the RS, a Primary Synchronization CHannel (P-SCH), and a Secondary Synchronization CHannel (S-SCH). A transmission frame carrying the three types of pilot signals is described with reference to FIG. 4.

Figure 4:
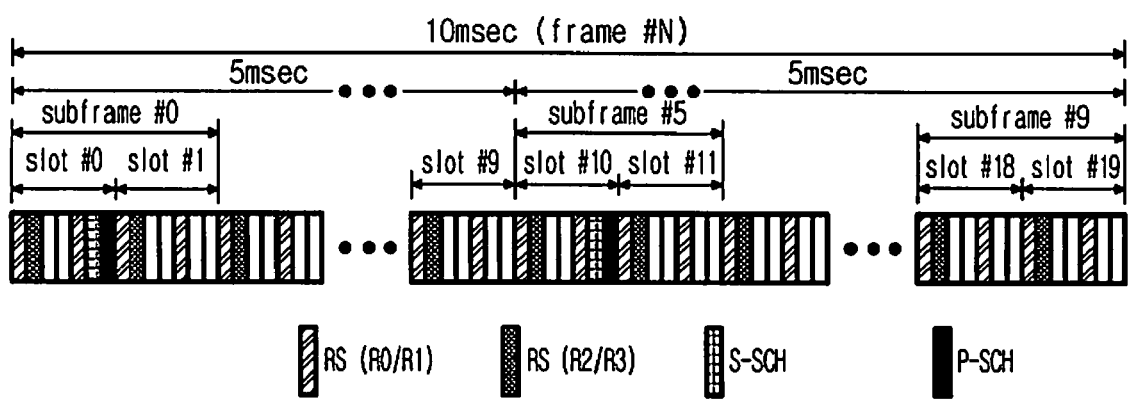
FIG. 4 is a diagram illustrating a structure of the frame used in an OFDM system, according to an embodiment of the present invention.

FIG. 4 is a diagram illustrating a structure of the frame for use in an OFDM system, according to an embodiment of the present invention.

Referring to FIG. 4, in the OFDM system, the $N^{th}$ frame (N is natural value), having a duration of 10 ms and transmitted by the transmitter, can be composed of 10 sub-frames. Each sub-frame is composed of 2 slots, and each slot is composed of 6 to 7 slots, i.e. $0^{th}$ to $5^{th}$ symbols or $0^{th}$ to $6^{th}$ symbols. As shown in FIG. 4, the 10 ms frame is composed of symbols arranged in a pattern that is recursive every 5 ms. With reference to FIG. 4, among the $0^{th}$ to $6^{th}$ symbols constituting the $0^{th}$ symbol, the $0^{th}$, $1^{st}$, and $4^{th}$ symbols carry the RS, the $5^{th}$ symbol carries the S-SCM, and the $6^{th}$ symbol carries the P-SCH. The P-SCH and the S-SCH are pilot signals transmitted for the purpose of cell search and the like, and the RS is a pilot signal transmitted for the purposes of the channel estimation, indication of Channel Quality Information (CQI), and the like. Also, each of the $1^{st}$, $2^{nd}$, and $9^{th}$ Slots includes the $0^{th}$, $1^{st}$, and $4^{th}$ slots carrying the RSs. In this frame structure, the symbol arrangement pattern repeats in the $10^{th}$, $11^{th}$, and $19^{th}$ after the first 5 ms interval. The frame structure, which is depicted in a time domain to assist in understanding the symbol timing offset estimation process, can be presented in frequency domain to assist in understanding the pilot signals, (i.e. the RS, P-SCM, and S-SCM) as shown in FIGS. 5, 6A, and 6B.

Figure 5:
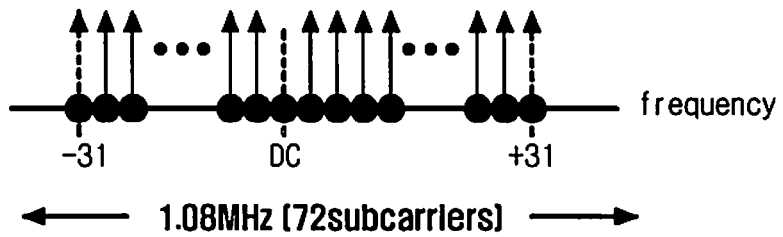
FIG. 5 is a diagram illustrating the P-SCH and S-SCH of the FIG. 4 in frequency domain.

FIG. 5 is a diagram illustrating the P-SCM and S-SCM of FIG. 4 in the frequency domain.

Referring to FIG. 5, regardless of the given bandwidth of the system, the P-SCM and S-SCH pilot signals are transmitted on 62 subcarriers centered around the DC subcarrier. Specifically, the P-SCM and S-SCH pilot signals are transmitted on the subcarriers arranged contiguously around the DC subcarrier. The DC subcarrier carries the carrier frequency signal and typically has null value. For reference, the LTE defines transmission bandwidths from 1.4 MHz to 20 MHz, and supports the FFT size in the range between 128 and 2048.

Figure 6A:
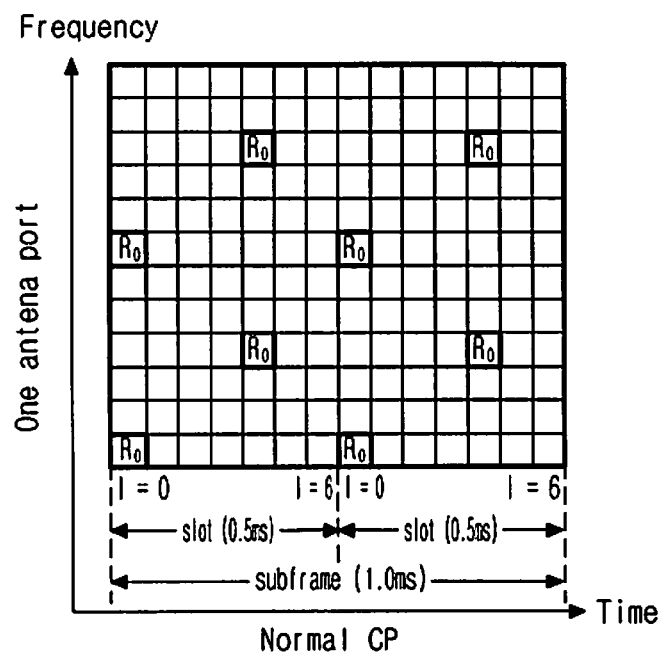
FIG. 6A is a graph illustrating an arrangement of RSs in a normal Cyclic Prefix (CP) mode for an OFDM system, according to an embodiment of the present invention.
Figure 6B:
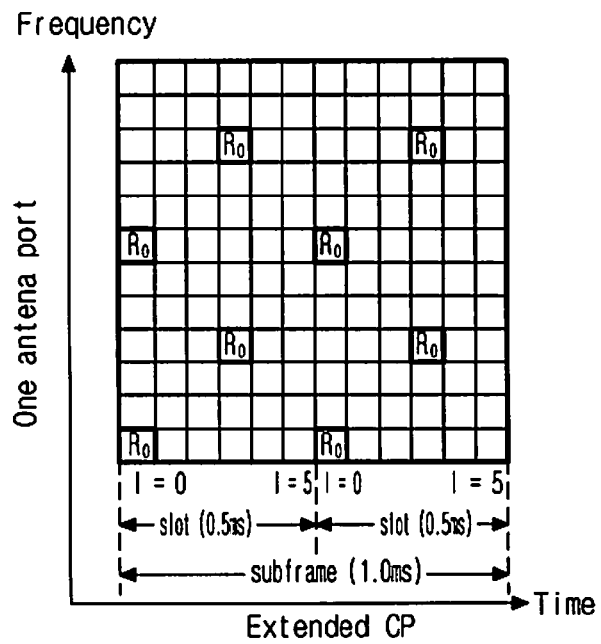
FIG. 6B is a graph illustrating an arrangement of RSs in an extended CP mode for an OFDM system, according to an embodiment of the present invention.

FIGS. 6A and 6B are graphs illustrating arrangements of RSs for use in an OFDM system, according to an embodiment of the present invention.

The LTE system supports two CP modes: a Normal CP Length mode using CP of which length is about 1/14 of the symbol duration and an Extended CP Length mode using CP of which length is about 1/4 of the symbol duration.

FIG. 6A shows an arrangement of the RSs in the Normal CP length mode, and FIG. 6B shows an arrangement of the RSs in the Extended CP Length mode.

Referring to FIGS. 6A and 6B, the RS is transmitted every sixth subcarrier of the $0^{th}$ symbol and the $4^{th}$ symbol. Unlike the P-SCH signal and S-SCH pilot signal that are arranged contiguously along the frequency axis, the RSs are arranged in an interval of 6 subcarriers along the frequency axis. As shown in FIGS. 6A and 6B, the RSs are arranged to alternate in both time and frequency. That is, the RSs are not arranged in the same frequency for each symbol.

The time axis interpolation can be performed on the RS pilot signals arranged in the above-described pattern such that the RS pilot signals are arranged in an interval of three subcarriers along the frequency axis. By performing the time axis interpolation, the RS pilot signals arranged in an interval of six subcarriers on the frequency axis can be rearranged in an interval of three subcarriers on the frequency axis. The time axis interpolation on the RS pilot signals is performed to extend the symbol timing offset range by narrowing the interval between the pilot signals on the frequency axis to the greatest extent possible.

The symbol timing offset estimation using the pilot signals according to an embodiment of the present invention is described hereinafter with reference to the drawings.

FIG. 7 is a block diagram illustrating a configuration of a symbol timing offset estimation apparatus of a modem of a receiver for the LTE system, according to an embodiment of the present invention. The symbol timing offset estimation apparatus, according to an embodiment of the present invention, can be applied to all kinds of mobile terminal modems configured to receive the RS and S-SCH signals as the pilot signals although it is described in association with the modem configured for a receiver of an LTE system. The receiver is depicted having only function blocks of the modem that are directly associated with the estimation of the symbol timing offset for purposes of simplicity. It should be noted that the receiver can include other function blocks.

Figure 8A:
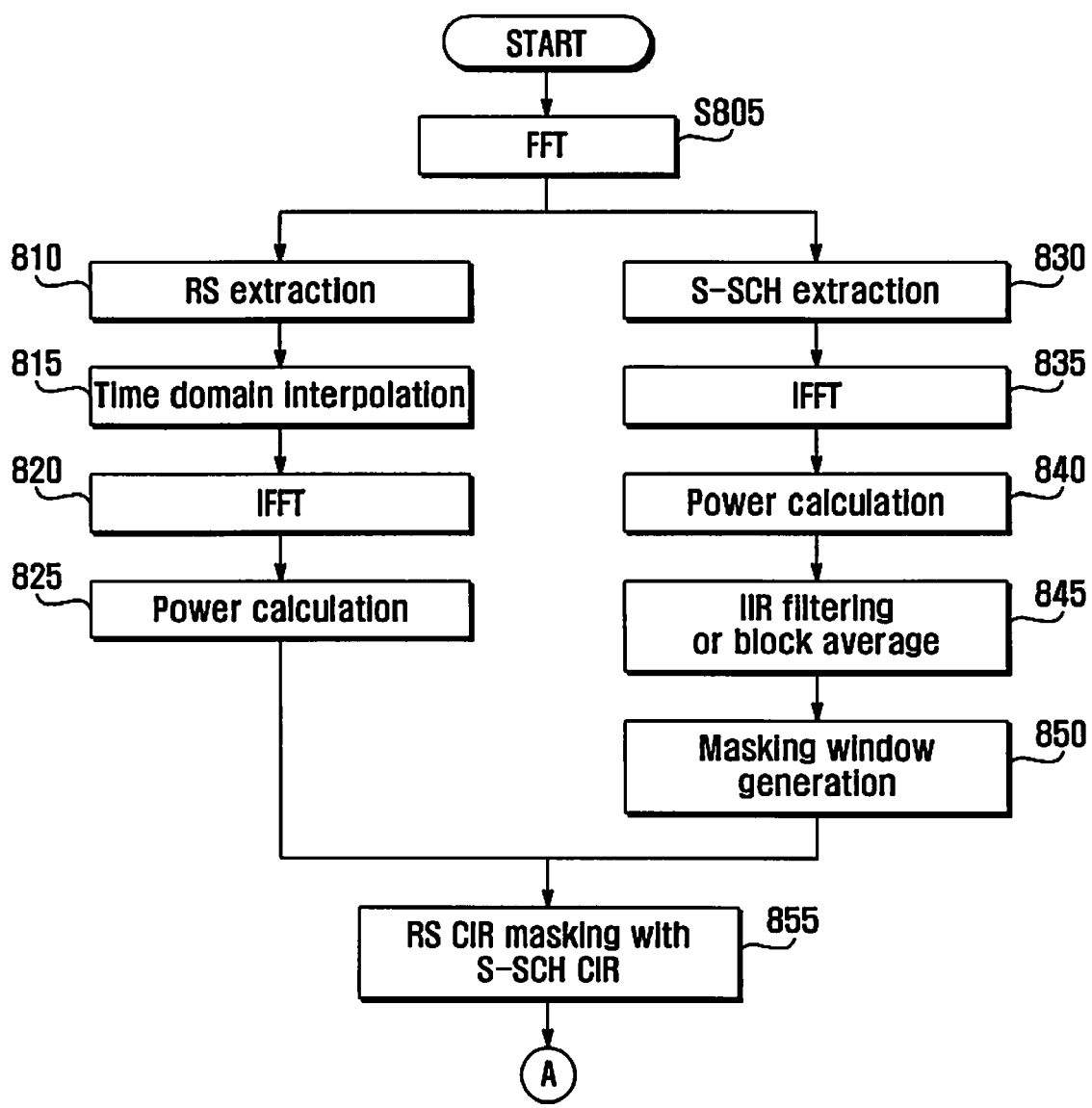
FIGS. 8A and 8B are a flowchart illustrating a symbol timing offset estimation method for a communication system, according to an embodiment of the present invention.
Figure 8B:
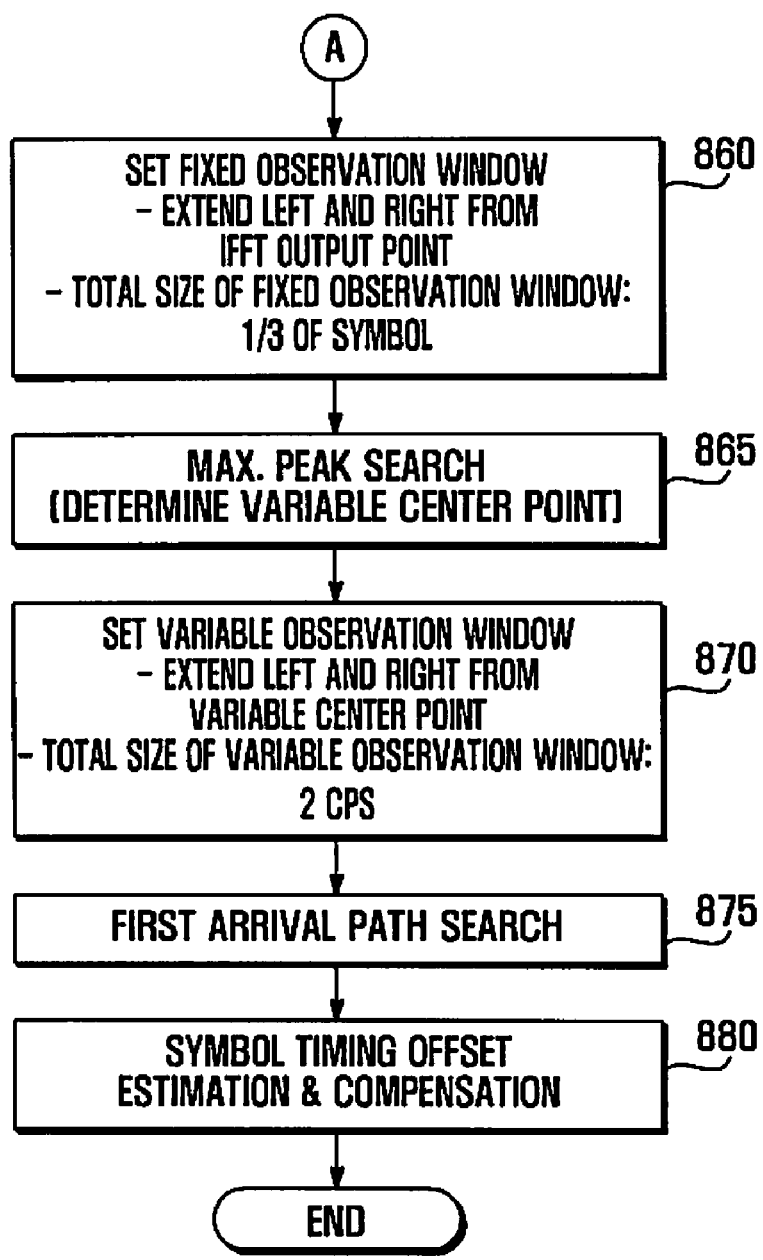

FIGS. 8A and 8B are a flowchart illustrating a symbol timing offset estimation method for a communication system, according to an embodiment of the present invention.

Unlike the conventional symbol timing offset estimation method using only the RS pilot signals, the symbol timing offset estimation method of an embodiment of the present invention uses the S-SCH pilot signals as well as the RS pilot signals such that the receiver is configured to extract the RS pilot signals and the S-SCH pilot signals from the received signal. Referring to FIGS. 7, 8A, and 8B, when a pilot signal is received, a Fast Fourier Transformer unit 705 of the receiver performs FFT on the received signal and outputs an FFT converted signal to an RS extractor 710 and an S-SCH extractor 730, in step S805. Once the FFT converted signal is input from the FFT 705, the RS extractor 710 extracts the RS pilot signals from the pilot subcarriers arranged on the frequency axis of the symbol, in step S810. The RS pilot signals extracted by the RS extractor 710 are output to a time domain interpolator 715, and the time domain interpolator 715 performs time domain interpolation (or extension) on the RS pilot signals, in step S815. Once the time domain interpolation is performed on the RS pilot signals, the RS pilot signals are arranged with narrower intervals, in the frequency domain, than before performing the time domain interpolation. For instance, when the time axis interpolation is performed on the RS pilot signals that are arranged with the interval of 6 subcarriers as shown in FIG. 6A and FIG. 6B, the RS pilot signals are rearranged with the interval of 3 subcarriers along the frequency axis, i.e. the interval between the RS subcarriers becomes narrow.

The time axis interpolated RS pilot signals are output to a first Inverse Fast Fourier Transformer unit 720, and the first IFFT 720 performs IFFT on the interpolated RS pilot signals, in step S820. The IFFT converted signals are output to a first power calculator 725, and the first power calculator 725 calculates the powers of the output signals of the first IFFT 720 so as to obtain the channel impulse response information of the RS pilot signals (CIR) including the power information, in step S825.

The FFT converted signal is also input to the S-SCH extractor 730. When the FFT converted signal is input, the S-SCH extractor 730 extracts the S-SCH pilot signals from the S-SCH pilot subcarriers among the subcarriers arranged along the time axis, in step S830. The extracted S-SCH pilot signals are output to a second IFFT 735, and the second IFFT 735 performs IFFT on the S-SCH pilot signals, in step S835. The IFFT converted S-SCH pilot signals are output to a second power calculator 740, and the second power calculator 740 calculates the powers of the S-SCH pilot signals to obtain the CIR information on the S-SCH, in step 840. The S-SCH CIR information is output to an Infinite Impulse Response (IIR) filter 745, and the IIR filter 745 performs IIR filtering or Block Averaging on the CIR information, in step S845. The IIR filtering or Block Averaging is performed for reducing the errors caused by noise by averaging or filtering recursive results since the S-SCH pilot signals are received in an interval of 5 ms within a frame, which is less frequent than the RS pilot signals. A masking window generator 750 generates a masking window signal for suppressing the repetition components and/or ghost components existing in the CIR value of the RS pilot signals, in step S850. The masking window signal can be generated in two different manners. In the first manner, the S-SCH CIR estimation result is used as the masking window signal. In the second manner, a specific value is applied to a predetermined range centered around the real channel components and the result value is generated as the masking window signal. How to generate the masking window signal is described in greater detail below.

A repetition/ghost components suppressor 760 performs masking on the CIR estimation result obtained from the RS pilot signals in accordance with the masking window signal output by the masking window generator 750, in step S855. That is, the repetition/ghost components suppressor 760 suppresses the repetition components and/or the ghost components existing in the estimation result of CIR from the RS pilot signals (hereinafter referred to as RS CIR) using the estimation result of CIR from the S-SCH pilot signals (hereinafter referred to as S-SCH CIR).

The suppression of the repetition components and/or the ghost components of the RS CIR estimation result using the S-SCH CIR estimation result is described in detail with reference to drawings. Prior to describing the repetition components and/or ghost components suppression process, characteristics of the S-SCH pilot signal and the RS pilot signal are first explained.

Figure 10A:
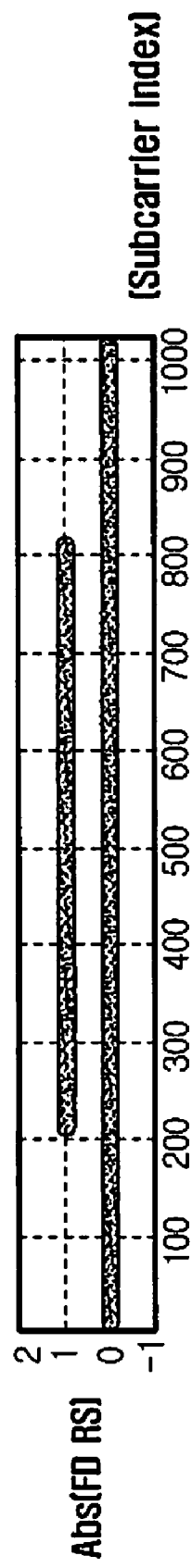
FIG. 10A is a graph illustrating an RS pilot signal in frequency domain for use in symbol timing offset estimation, according to an embodiment of the present invention.
Figure 10B:
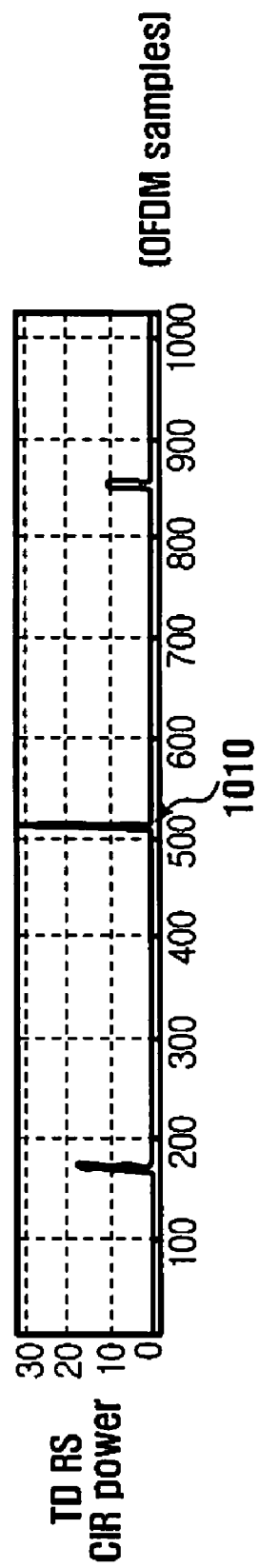
FIG. 10B is a graph illustrating a CIR estimation result obtained from the RS pilot signal characterized as in FIG. 10A.

FIG. 9A is a graph illustrating characteristics of an S-SCH pilot signal in frequency domain for use in a symbol timing offset estimation, according to an embodiment of the present invention. FIG. 9B is a graph illustrating a CIR estimation result obtained from the S-SCH pilot signal characterized as in FIG. 9A. FIG. 10A is a graph illustrating an RS pilot signal in frequency domain for use in a symbol timing offset estimation, according to an embodiment of the present invention. FIG. 10B is a graph illustrating a CIR estimation result obtained from the RS pilot signal characterized as in FIG. 10A. For the purpose of simplicity, the characteristics of the S-SCH and RS pilot signals are described in association with an example of a single path channel environment as shown in FIGS. 9A, 9B, 10A, and 10B rather than multipath channel environment. However, the characteristics of the S-SCH and RS pilot signals can be applied to a multipath channel environment.

With reference to the frequency domain graph as shown in FIG. 5, FIG. 9A shows characteristics of the S-SCH pilot signal in which the 62 subcarriers centered around the DC subcarrier have an absolute value of '1', and the remaining subcarriers have an absolute value of '0'. FIG. 9B shows characteristics of the S-SCH CIR estimation result in time domain in which only the region of the real channel component 910 shows a high power value.

With reference to the time and frequency block diagram as shown in FIGS. 6A and 6B, FIG. 10A shows the characteristics of the RS pilot signal in which the interpolated RS pilot signals are arranged in an interval, e.g. the interval of three subcarriers, has a value of '1' and the remaining subcarriers have a value of '0'. Accordingly, the subcarriers having the value '1' are widely spread. FIG. 10B shows the RS CIR estimation result in time domain in which the repetition components and/or ghost components appear as well as the real channel component 1010.

As described above with reference to FIGS. 9A, 9B, 10A, and 10B, the CIR estimation result using the S-SCH pilot signals shows no repetition components and ghost components but low time resolution rate due to the pilot signals existing in a region concentrated around the DC subcarrier in frequency domain. Thus, it is difficult to use the S-SCH CIR estimation result for symbol timing offset estimation independently. In the high delay spread channel environment or high Doppler frequency channel environment, however, the S-SCH CIR estimation result can be used to suppress the repetition components and/or the ghost components appearing in the RS CIR estimation result. With the S-SCH CIR estimation result, the RS CIR estimation result having the repetition components and/or ghost components can be used for estimating the real channel component accurately. As aforementioned, there are two masking signal generation schemes for suppressing the repetition components and/or the ghost components that appeared in the RS CIR estimation result using the S-SCH CIR estimation result. The procedures for generating the masking signal using the two schemes and suppressing the repetition components and/or the ghost components that appeared in the RS CIR estimation result are described hereinafter with reference to drawings.

FIGS. 11A to 11C are graphs illustrating steps of a repetition components and/or ghost components suppression process of the symbol timing offset estimation method, according to an embodiment of the present invention.

FIG. 11A is a graph illustrating an S-SCH CIR estimation result for use in the symbol timing offset estimation method, according to an embodiment of the present invention. FIG. 11B is a graph illustrating an RS CIR estimation result for use in the symbol timing offset estimation method, according to an embodiment of the present invention. FIG. 11C is a graph illustrating an RS CIR estimation result of which repetition components and/or ghost components are suppressed using the S-SCH CIR estimation result of FIG. 11A.

As shown in FIGS. 11A and 11B, the most frequency components of the S-SCH pilot signal, except for the real channel components 1101, are zero in CIR power, and the RS pilot signal has plural repetition components and/or ghost components having the non-zero CIR power as well as the real channel components 1111. The repetition components and/or ghost components that appeared in the RS pilot signal can be suppressed by multiplying the RS CIR estimation result of FIG. 11B with the S-SCH CIR estimation result of FIG. 11A and, consequently, only the real channel components 1121 appear as shown in FIG. 11C.

FIGS. 11A to 11C show the process for suppressing the repetition components and/or the ghost components appeared in the RS CIR estimation result using the S-SCH CIR estimation result as the masking signal. In other words, by multiplying the S-SCH CIR estimation result with the RS CIR estimation result, the repetition components and/or the ghost components are suppressed in the RS CIR estimation result, thereby obtaining an accurate RS CIR estimation result.

FIGS. 12A to 12F are graphs illustrating steps of a repetition components and/or ghost components suppression process of the symbol timing offset estimation method, according to another embodiment of the present invention. In the repetition components and/or ghost components suppression process as shown in FIGS. 12A to 12F, a specific value (e.g. '1') is applied to a region in which the real channel components are positioned for suppressing the repetition components and/or ghost components that appeared in the RS CIR estimation result.

Figure 12A:
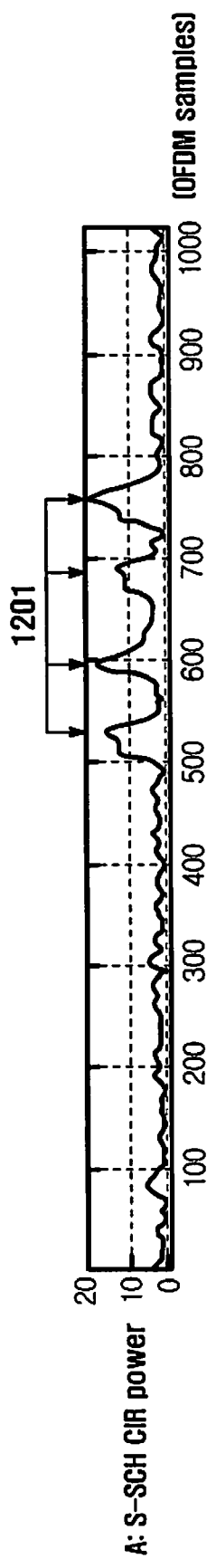
FIG. 12A is a graph illustrating an S-SCH CIR estimation result, according to an embodiment of the present invention.
Figure 12B:
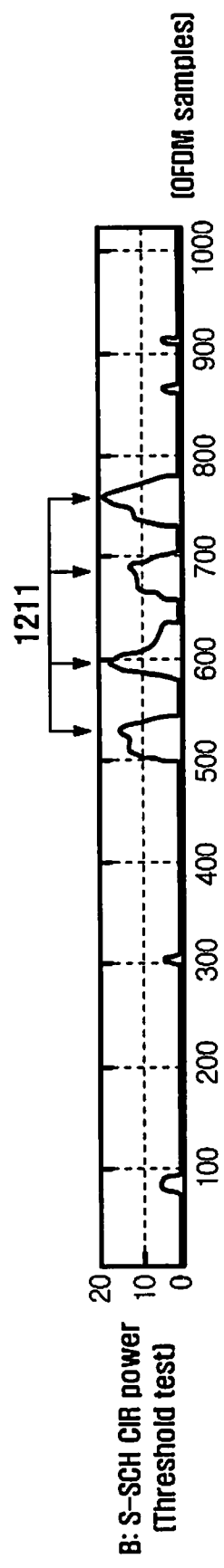
FIG. 12B is a graph illustrating an intermediate signal form of the S-SCH CIR estimation result obtained through a threshold test on the S-SCH CIR estimation result of FIG. 12A.
Figure 12C:
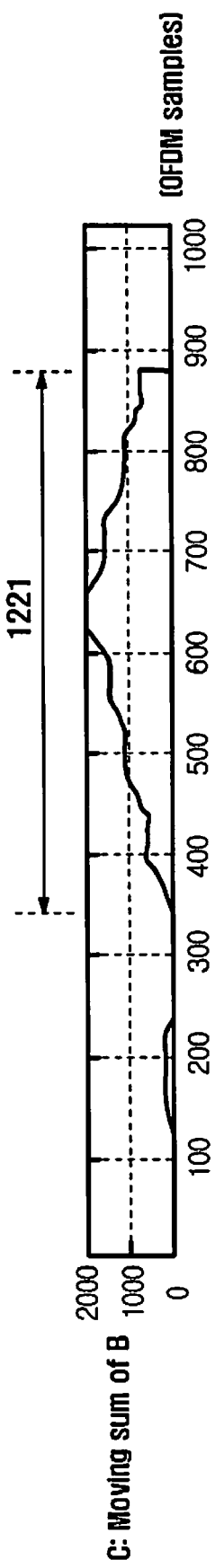
FIG. 12C is a graph illustrating an intermediate signal form of the S-SCH CIR estimation result obtained by summing the CIR power values while moving a window along the OFDM samples of FIG. 12B.

FIG. 12A is a graph illustrating an S-SCH CIR estimation result, according to an embodiment of the present invention. FIG. 12B is a graph illustrating an intermediate signal form of the S-SCH CIR estimation result which is obtained through a threshold test which nullifies the components having the CIR power values less than a predetermined threshold value from the S-SCH CIR estimation result of FIG. 12A. Since the CIR powers less than the threshold value are nullified by multiplying by '0', the power levels of the most frequency components, except for the real channel components 1201 and 1211, become '0'. FIG. 12C is a graph illustrating an intermediate signal form of the S-SCH CIR estimation result, which is obtained by summing the CIR power values while moving a window along the OFDM samples of FIG. 12B. As shown in FIG. 12C, the summation results show relatively high values in a region 1221 around the real channel components. A masking window is set with a length, e.g. a specific value equal to a length of a CP (e.g. '1'), centered around the position having the highest value in FIG. 12C. FIG. 12D is a graph illustrating a masking window produced with reference to the intermediate signal form of FIG. 12C. In FIG. 12D, reference number 1231 denotes the masking window. FIG. 12E is a graph illustrating an RS CIR estimation result, according to an embodiment of the present invention. As shown in FIG. 12E, the RS CIR estimation result shows plural repetition components and/or ghost components caused by the characteristics of the RS pilot signal. The RS CIR estimation result, having the repetition components and/or ghost components, is multiplied with the masking signal, i.e., the masking window signal form, whereby the repetition components and/or ghost components are suppressed and, consequently, the real channel components having the high power values remain as shown in FIG. 12F. FIG. 12F is a graph illustrating a signal form obtained by suppressing unnecessary frequency components from the RS CIR estimation result of FIG. 12E. In FIG. 12E, reference number 1241 denotes the real channel components. In FIG. 12F, reference number 1251, denotes the real channel components.

After obtaining the RS CIR estimation result free from the repetition components and/or ghost components as shown in FIGS. 11C and 12F, a peak position is detected in a fixed observation window set with reference to the IFFT output point. A variable observation window centered around the peak position is set. The variable observation window is equal to the length of the CP. The symbol timing offset is estimated by detecting the first downlink path within the variable observation window. The symbol timing offset estimation procedure using the RS CIR estimation result from which the repetition components and/or ghost components are suppressed is described in greater detail below.

Returning to FIGS. 7 and 8B, the RS CIR estimation result from which the repetition components and/or ghost components are suppressed is output to an observation window generator 765. The observation window generator 765 sets a fixed observation window having a predetermined length in consideration of the arrangement of the of the pilot signals centered around the IFFT output point on the frequency axis, in step S860. For instance, the fixed observation window is set to ⅓ of the symbol duration. The observation window generator 765 detects a highest peak of power within the fixed observation window and sets the position of the highest peak as the center frequency of a variable observation window, in step S865. The observation window generator 765 sets a variable observation window having a predetermined length centered around the center frequency, in step S870. For example, the variable observation window is determined by extending left and right from the center frequency as much as the length of the CP such that the length of the variable observation window is equal to two CPs. A first arriving path search 770 searches for the channel component received first within the variable window on the RS CIR estimation result of which the repetition components and/or ghost components are suppressed, i.e. the channel component of the first arrival path, in step S875. A symbol timing estimator 775 estimates and compensates the timing offset of the symbol using the searched channel component, in step S880. In this manner, the symbol timing offset estimation method of the present invention can estimate the symbol timing offset accurately.

The processes for setting the variable observation window in the RS CIR estimation result of which repetition components and/or ghost components are suppressed with the S-SCH CIR estimation result, and estimating the symbol timing offset, are described in greater detail below.

Figure 13A:
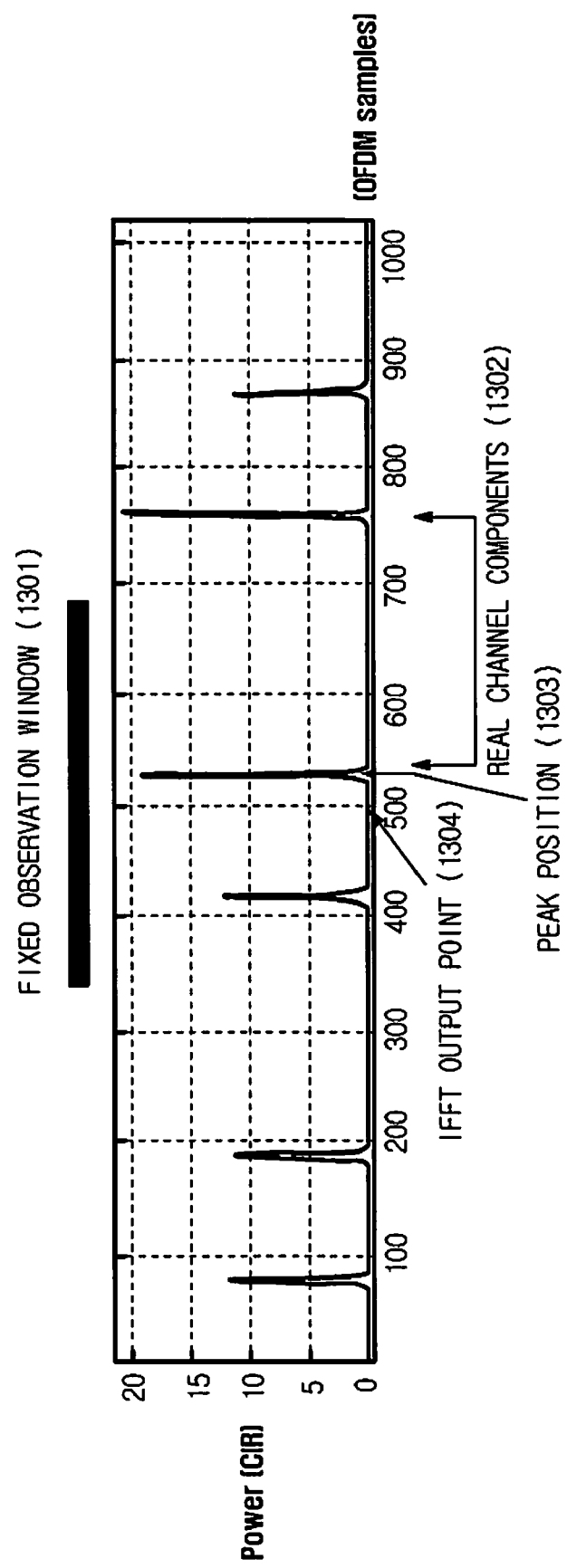
FIG. 13A is a graph illustrating an RS CIR estimation result obtained in a multipath fading channel environment having a large delay spread, according to an embodiment of the present invention.
Figure 13B:
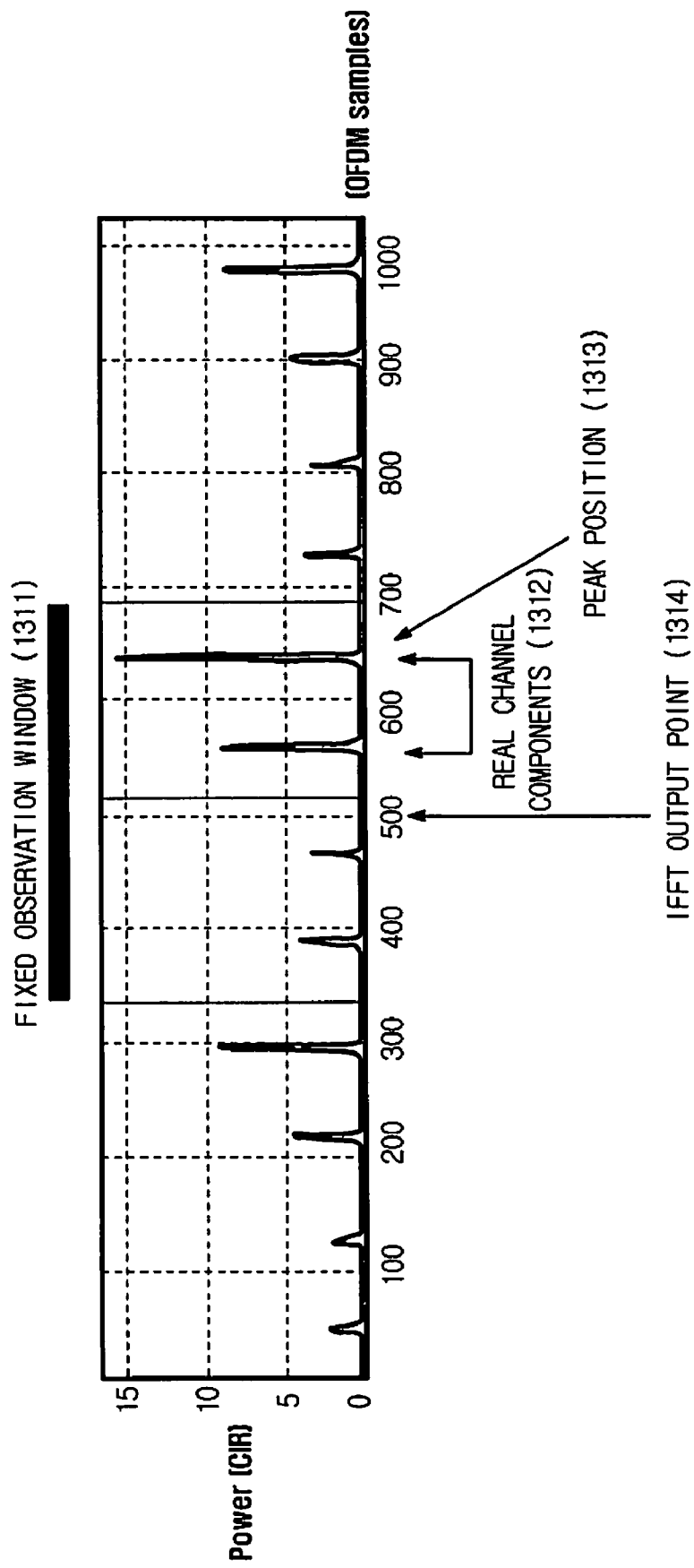
FIG. 13B is a graph illustrating an RS CIR estimation result obtained in a multipath fading channel environment having two paths of which delay spread is 5 μs and a large Doppler frequency of about 900 Hz, according to an embodiment of the present invention.
Figure 13C:
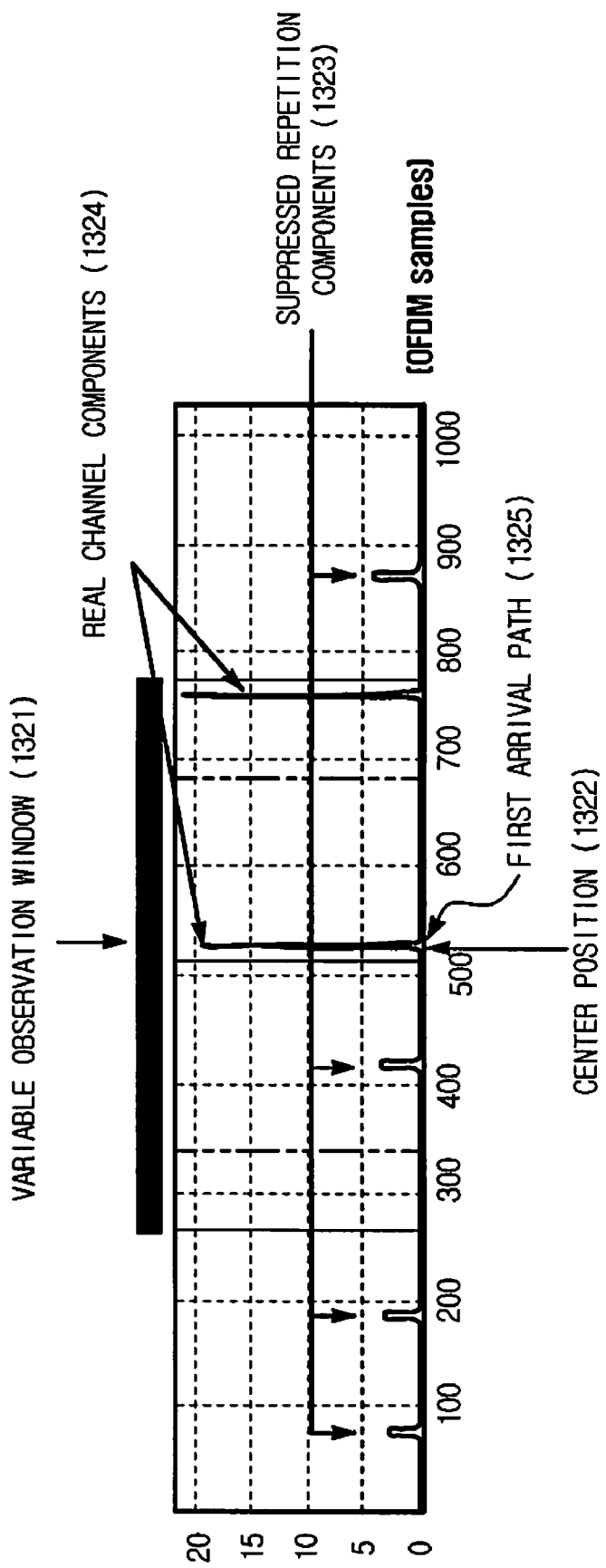
FIG. 13C is a graph illustrating how to set a variable observation window on the RS CIR estimation result for estimating a symbol timing offset, according to an embodiment of the present invention.

FIGS. 13A and 13B are graphs illustrating how to set a fixed observation window on the RS CIR estimation result having repetition components and ghost components that are obtained, according to an embodiment of the present invention. FIG. 13C is a graph illustrating how to set a variable observation window using the fixed observation windows of FIGS. 13A and 13B.

FIG. 13A shows RS CIR estimation results obtained in a multipath fading channel environment having large delay spread, e.g. the delay spread of 15 μs (about ¼ of symbol duration). The RS pilot signals are arranged in an interval of three subcarriers (i.e. RS pilot interval is 3) on the frequency axis by performing the time axis interpolation on the RS pilot signals as described with reference to FIGS. 6A and 6B. In the large delay spread environment, the RS CIR estimation result shows multiple repetition components as well as the real channel components 1302 as shown in FIG. 13A. A fixed observation window 1301 is set by extending left and right from an IFFT output time point 1304 as much as ⅙ of symbol duration (total length of the fixed observation window is ⅓ of symbol duration). Within the fixed observation window 1301, a peak of the highest power is detected and a point 1303 of the highest power peak is determined as a center of the variable observation window. The repetition components caused by the large delay spread, as shown in FIG. 13B, are likely to occur in the extended CP mode in which the CP is longer than the symbol duration.

FIG. 13B shows an RS CIR estimation result obtained in a multipath fading channel environment (center frequency is 2.7 GHz and movement speed of the mobile terminal is about 370 km/h) having two paths of which delay spread is 5 μs (about 1/12 of symbol duration) and large Doppler frequency of about 900 Hz. It is assumed that the RS pilot signals are arranged in an interval of three subcarriers on the frequency axis, i.e. RS pilot interval is 3, by performing time axis interpolation on the RS pilot signals as shown in FIGS. 6A and 6B. In FIG. 13B, the delay spread is relatively short and about 1/12 of the symbol duration such that no repletion caused repetition components appears. However, as the movement speed of the mobile increases, the temporal variation of the channel increases and thus the interpolation error rate increases in the result of the time axis interpolation performed on the RS pilot signal, resulting in occurrence of ghost components. Accordingly, the RS CIR estimation result shows the repetition components and/or particularly ghost components as well as real channel components 1312 of the RS pilot signals. A fixed observation window 1311 is set by extending left and right from an IFFT output time point 1314 as much as ⅙ of symbol duration (total length of the fixed observation window is ⅓ of symbol duration). Within the fixed observation window 1311, a peak of the highest power is detected and a highest power peak point 1313 is determined as the center of the variable observation window.

FIG. 13A shows how to set a variable observation window on the RS CIR estimation result for estimating a symbol timing offset, according to an embodiment of the present invention. Setting the variable observation window for estimating the symbol timing offset in the RS CIR estimation result (as shown in FIG. 13A or FIG. 13B) having the repetition components and/or ghost components appearing in the multipath fading channel environment having a large delay spread or a large Doppler frequency is described with reference to a detailed example. The variable observation window setting process depicted in FIG. 13A is described by showing the RS CIR estimation result having the repetition components and/or ghost components appearing in the multipath fading channel environment having a large delay spread or a large Doppler frequency, for the purpose of simplicity. The peak position 1303 detected in FIG. 13A is set as a center position 1322 and, consequently, a variable observation window 1321 is determined by extending left and right from the center position 1322 as long as the length of CP. The repetition components of the RS CIR estimation result of FIG. 13A is suppressed such that only real channel components 1323 remain as shown in FIG. 13C. The variable observation window 1321 has a duration equal to the length of two CPs and includes the real channel components 1324. A channel corresponding to the real channel component that arrived first among real channel components 1324 within the variable observation window is determined as the first arrival path 1325. The symbol timing offset can be estimated and compensated using the first arrival path 1325.

In the multipath fading channel environment having the large delay spread or large Doppler frequency, the performances of tracking algorithms implemented with the symbol timing offset estimation method using the RS pilot signals and the S-SCH pilot signals according to the present invention and the conventional symbol timing offset estimation method using only the RS pilot signals are described with reference to FIGS. 14A and 14B.

Figure 14A:
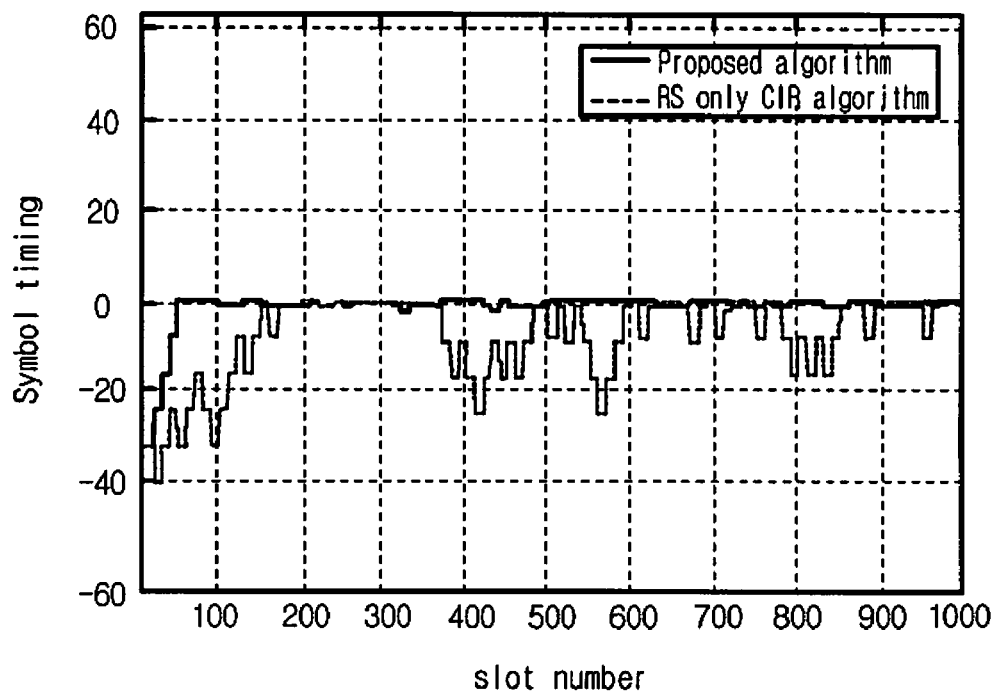
FIG. 14A is a graph illustrating a symbol timing synchronization performance comparison between a symbol timing offset estimation method according to an embodiment and a conventional symbol timing offset estimation method.
Figure 14B:
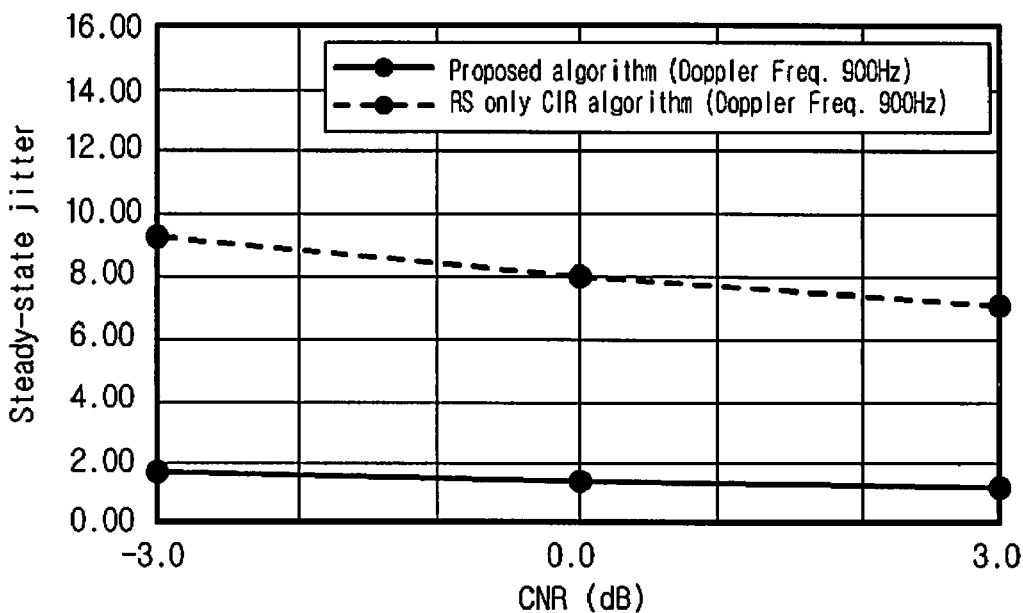
FIG. 14B is a graph illustrating a steady-state jitter performance comparison between a symbol timing offset estimation method according to an embodiment of the present invention and a conventional symbol timing offset estimation method.

FIGS. 14A and 14B are graphs illustrating symbol timing synchronization performance comparison between the symbol timing offset estimation algorithm according to the present invention and the conventional symbol timing offset estimation algorithm. The simulations have been performed under the identical conditions having a system bandwidth of 10 MHz (FFT-1024), a multipath fading channel having two channel paths, a delay spread of 150 μs (about ¼ of symbol duration), and a Doppler frequency of 900 Hz (center frequency of 2.7 GHz and terminal movement speed of 370 km/h).

Referring to FIG. 14A, the symbol timing offset estimation algorithm proposed by the present invention shows that the value of the symbol timing value does not reach zero at the beginning but gradually increases to reach zero after a few slots (time) and then maintains zero state. The symbol timing value at zero means that the symbol timing is synchronized. At that time, the symbol timing value is converged, and the time taken for convergence is called convergence time. In contrast, the conventional symbol timing offset estimation algorithm using only the RS shows a convergence time, which is longer than that of the symbol timing offset estimation algorithm of the present invention. That is, the symbol timing offset estimation algorithm of the present invention is superior to the conventional symbol timing offset estimation algorithm in view of convergence time. Also, unlike the symbol timing offset estimation algorithm of the present invention which maintains a zero state steadily after being converged to zero, the symbol timing value of the conventional symbol timing offset estimation algorithm is deviated from zero state frequently after it had converged to zero due to symbol timing offset estimation errors. The deviation degree showing how often the symbol timing value deviated from the steady-state zero value after being converged can be checked by means of jitter value showing variation.

FIG. 14B shows the steady-state jitters of the symbol timing offset estimation algorithm of the present invention and the conventional symbol timing offset estimation algorithm. As shown in FIG. 14B, the symbol timing offset estimation algorithm of the present invention shows the variation of the steady-state jitter value in the range of at most 2 OFDM samples along the entire range of Carrier to Noise (CNR) (dB), whereas the conventional symbol timing offset estimation algorithm using only the RS shows the variation of the steady-state jitter value in the range of 10 OFDM samples.

From the simulation results, it is observed that the symbol timing offset estimation method using the RS and S-SCH according to the present invention shows a shorter synchronization timer and a more stable steady-state jitter value than those of the conventional symbol timing offset estimation method using only the RS. Accordingly, the symbol timing offset estimation method of the present invention is superior to the conventional symbol timing offset estimation method.

As described above, the symbol timing offset estimation method and apparatus of the present invention is advantageous in preventing the symbol timing offset estimation performance from being degraded in an environment having large delay spread (particularly in the extended CP mode) and large Doppler frequency due to the increase of terminal's movement speed.

Also, the symbol timing offset estimation method and apparatus of the present invention is advantageous in accurately estimating the symbol timing offset by effectively suppressing the repetition components and ghost components which appear especially in the environment having large delay spread (particularly in the extended CP mode) and large Doppler frequency due to the increase of terminal's movement speed using the S-SCH and RS pilot signals. Since the repetition components and ghost components occurred in the RS CIR estimation result are suppressed using the S-SCH pilot signals, it is possible to extend and the observation window and to move the observation window appropriated with the channel state, thereby estimating the first arrival path accurately.

While the invention has been shown and described with reference to certain preferred embodiments thereof, it will be understood by those skilled in the art that various changes in form and detail may be made therein without departing from the spirit and scope of the present invention as defined by the appended claims.

What is claimed is:

1. A symbol timing offset estimation method for an Orthogonal Frequency Division Multiplexing (OFDM) system, comprising the steps of:
    acquiring a Carrier to Interference Ratio (CIR) of a Reference Signal (RS) using received pilot signals, wherein the RS CIR comprises power information on channel components of the RS;
    acquiring a CIR of a Secondary Synchronization Channel (S-SCH) using the received pilot signals, wherein the S-SCH CIR comprises power information on channel components of the S-SCH;
    suppressing unnecessary channel components from the RS CIR using the S-SCH CIR, wherein real channel components of the RS remain;
    setting an observation window having a predetermined duration for windowing the real channel components of the RS;
    searching for a first arriving channel component within the observation window; and
    estimating a start point of data using the first arriving channel component.

2. The symbol timing offset estimation method of claim 1, wherein setting an observation window comprises:
    detecting a peak having a highest power value within a fixed observation window having a predetermined duration centered around an Inverse Fast Fourier Transform (IFFT) output time point; and
    setting a variable observation window having a predetermined duration centered around a position of the peak.

3. The symbol timing offset estimation method of claim 2, wherein the duration of the variable observation window is equal to two Cycle Prefixes (CPs) and the variable observation window is determined by extending left and right from the position of the peak as much as a duration of a CP.

4. The symbol timing offset estimation method of claim 3, wherein the variable observation window can move along a time axis in accordance with a position of the peak.

5. The symbol timing offset estimation method of claim 2, wherein the predetermined duration of the fixed observation window is ⅓ of a symbol duration, and the fixed observation window is defined by extending left and right from the IFFT output time point as much as ⅙ of the symbol duration.

6. The symbol timing offset estimation method of claim 1, wherein suppressing unnecessary channel components comprises multiplying the RS CIR with the S-SCH CIR.

7. The symbol timing offset estimation method of claim 6, wherein the unnecessary channel components comprise repetition components caused by Intersymbol Interferences in a large delay spread environment and ghost components and repetition components that occur in a large Doppler frequency environment due to fast movement of a terminal.

8. The symbol timing offset estimation method of claim 1, wherein suppressing unnecessary channel components comprises:
    performing a threshold test on the acquired S-SCH CIR;
    summing power values in units of a predetermined period while moving within a range of the S-SCH CIR;
    applying a predetermined value to the summed power values within a range centered around a highest summed power value; and
    multiplying result values obtained by applying the predetermined to the summed power values with the RS CIR.

9. The symbol timing offset estimation method of claim 8, wherein performing a threshold test comprises nullifying components of which power values are less than a predetermined threshold value in the S-SCH CIR.

10. The symbol timing offset estimation method of claim 1, further comprising:
   performing a Fast Fourier Transform (FFT) on the received pilot signals prior to RS CIR;
   extracting the RS from the FFT transformed pilot signals;
   performing a time axis interpolation on the extracted RS;
   performing an IFFT on the time axis interpolated RS; and
   calculating power values of channel components of the RS output after the IFFT.

11. The symbol timing offset estimation method of claim 1, further comprising:
   performing an FFT on the received pilot signals prior to S-SCH CIR;
   extracting the S-SCH from the FFT transformed pilot signals;
   performing an IFFT on the extracted S-SCH; and
   calculating power values of channel components of the S-SCH output after the IFFT.

12. The symbol timing offset estimation method of claim 11, further comprising:
   performing Infinite Impulse Response (IIR) filtering or block averaging on the S-SCH CIR after acquiring the S-SCH CIR; and
   generating a masking signal from the IIR filtered or block averaged S-SCH CIR for suppressing unnecessary channel components of the RS, wherein the real channel components of the RS remain.

13. A symbol timing offset estimation apparatus for an Orthogonal Frequency Division Multiplexing (OFDM) system, comprising:
   a Carrier to Interference Ratio (CIR) calculator which acquires a CIR of a Reference Signal (RS) using received pilot signals and a CIR of a Secondary Channel (S-SCH) using the received pilot signals, wherein the RS CIR comprises power information on channel components of the RS and the S-SCH CIR comprises power information on channel components of the S-SCH;
   a noise suppressor which suppresses unnecessary channel components from the RS CIR using the S-SCH CIR, wherein real channel components of the RS remain;
   an observation window generator which generates an observation window having a predetermined duration for windowing the real channel components of the RS; and
   a symbol timing offset estimator which estimates, when a first arriving channel component is searched within the observation window, a start position of data using the first arriving channel component.

14. The symbol timing offset estimation apparatus of claim 13, wherein the observation window generator sets a fixed observation window having a predetermined duration centered around an Inverse Fast Fourier Transform (IFFT) output time point in the range of the RS CIR, detects a peak having a highest power value within the fixed observation window, and sets a variable observation window having a predetermined duration centered around a position of the peak.

15. The symbol timing offset estimation apparatus of claim 14, wherein the observation window generator sets the duration of the variable observation window to be equal to two Cycle Prefixes (CPs) by extending left and right from the position of the peak as much as a duration of a CP.

16. The symbol timing offset estimation apparatus of claim 15, wherein the variable observation window can move along a time axis in accordance with a position of the peak.

17. The symbol timing offset estimation apparatus of claim 14, wherein the observation window generator sets the predetermined duration of the fixed observation window to be ⅓ of a symbol duration by extending left and right from the IFFT output time point as much as ⅙ of the symbol duration.

18. The symbol timing offset estimation apparatus of claim 13, wherein the noise suppressor performs a multiplication operation on the acquired RS CIR and S-SCH CIR.

19. The symbol timing offset estimation apparatus of claim 18, wherein the unnecessary channel components comprise repetition components caused by Intersymbol Interferences in a large delay spread environment and ghost components and repetition components that occur in a large Doppler frequency environment due to fast movement of a terminal.

20. The symbol timing offset estimation apparatus of claim 13, wherein the noise suppressor performs a threshold test on the acquired S-SCH CIR, sums power values in units of a predetermined period while moving within a range of the S-SCH CIR, applies a predetermined value to the summed power values within a range centered around a highest summed power value, and multiplies result values obtained by applying the predetermined to the summed power values with the RS CIR.

21. The symbol timing offset estimation apparatus of claim 20, wherein the threshold test nullifies components of which power values are less than a predetermined threshold value in the S-SCH CIR.

22. The symbol timing offset estimation apparatus of claim 13, further comprising:
   a Fast Fourier Transformer unit which performs a Fast Fourier Transform (FFT) on the received pilot signals;
   an RS extractor which extracts the RS from the FFT transformed pilot signals;
   am interpolator which performs a time axis interpolation on the extracted RS; and
   an Inverse Fast Fourier Transformer unit which performs an IFFT on the time axis interpolated RS.

23. The symbol timing offset estimation apparatus of claim 22, wherein the CIR calculator comprises an RS CIR calculator, which calculates power values of channel components of the RS CIR output after the IFFT.

24. The symbol timing offset estimation apparatus of claim 13, further comprising:
   a Fast Fourier Transformer unit which performs an FFT on the received pilot signals;
   an S-SCH extractor which extracts the S-SCH from the FFT transformed pilot signals;
   an Inverse Fast Fourier Transformer unit which performs an IFFT on the extracted S-SCH.
   a filtering unit which performs Infinite Impulse Response (IIR) filtering or block averaging on the S-SCH CIR; and
   a masking generator which generates a masking signal from the IIR filtered or block averaged S-SCH CIR for suppressing unnecessary channel components of the RS CIR, wherein the real channel components of the RS remain.

25. The symbol timing offset estimation apparatus of claim 24, wherein the CIR calculator comprises an S-SCH CIR calculator, which calculates power values of channel components of the S-SCH output from the IFFT.

* * * * *